US012607322B2

(12) United States Patent 
Pawliczek et al.

(10) Patent No.: US 12,607,322 B2 
(45) Date of Patent: Apr. 21, 2026

(54) AIRCRAFT LIGHT, AIRCRAFT COMPRISING AN AIRCRAFT LIGHT, AND METHOD OF MANUFACTURING AN AIRCRAFT LIGHT

(71) Applicant: Goodrich Lighting Systems GmbH & Co. KG, Lippstadt (DE)

(72) Inventors: Carsten Pawliczek, Lippstadt (DE); Anil Kumar Jha, Lippstadt (DE); Marion Depta, Lippstadt (DE); Andre Hessling-von Heimendahl, Koblenz (DE)

(73) Assignee: GOODRICH LIGHTING SYSTEMS GMBH & CO. KG, Lippstadt (DE)

( * ) Notice: Subject to any disclaimer, the term of this patent is extended or adjusted under 35 U.S.C. 154(b) by 0 days.

(21) Appl. No.: 19/068,906

(22) Filed: Mar. 3, 2025

(65) Prior Publication Data

US 2025/0290617 A1 Sep. 18, 2025

(30) Foreign Application Priority Data

Mar. 15, 2024 (EP) .................................... 24163794

(51) Int. Cl.
| | |
|---|---|
| *F21S 43/249* | (2018.01) |
| *B64D 45/08* | (2006.01) |

(Continued)

(52) U.S. Cl.
CPC ............ *F21S 43/249* (2018.01); *B64D 45/08* (2013.01); *B64D 47/04* (2013.01); *B64D 47/06* (2013.01);

(Continued)

(58) Field of Classification Search
CPC ....... F21S 43/249; H05B 47/11; B64D 45/08; B64D 47/04; B64D 47/06; F21V 15/01
See application file for complete search history.

(56) References Cited

U.S. PATENT DOCUMENTS

| | | | |
|---|---|---|---|
| 7,261,452 B2 | 8/2007 | Coushaine et al. |
| 8,419,220 B2 | 4/2013 | Kong |
| | (Continued) | |

FOREIGN PATENT DOCUMENTS

| | | |
|---|---|---|
| EP | 4082918 | 11/2022 |
| EP | 4303128 | 1/2024 |
| | (Continued) | |

OTHER PUBLICATIONS

European Patent Office, European Search Report dated Jun. 13, 2024 in Application No. 24163794.1.

*Primary Examiner* — Christopher E Dunay 
(74) *Attorney, Agent, or Firm* — SNELL & WILMER L.L.P.

(57) ABSTRACT

An aircraft light comprises an arrangement of a plurality of light sources, arranged on a light source support, and a light guide arranged for receiving and transmitting light emitted by the plurality of light sources. The light guide comprises an optical fiber; a coupling portion provided at an input end of the optical fiber facing the plurality of light sources, the coupling portion comprising a plurality of legs, with each of the plurality of legs extending between the input end of the optical fiber and a respective one of the plurality of light sources; and a light exit portion, providing light received and transmitted from the plurality of light sources at a light head of the aircraft light.

15 Claims, 5 Drawing Sheets

(51) Int. Cl.

| | |
|---|---|
| *B64D 47/04* | (2006.01) |
| *B64D 47/06* | (2006.01) |
| *F21V 15/01* | (2006.01) |
| *H05B 47/11* | (2020.01) |
| *F21W 107/30* | (2018.01) |
| *F21Y 115/10* | (2016.01) |

(52) U.S. Cl.
CPC .............. *F21V 15/01* (2013.01); *H05B 47/11* (2020.01); *B64D 2203/00* (2013.01); *F21W 2107/30* (2018.01); *F21Y 2115/10* (2016.08)

(56) References Cited

U.S. PATENT DOCUMENTS

| | | | |
|---|---|---|---|
| 8,476,813 B2 | 7/2013 | Kong | |
| 2008/0210953 A1 | 9/2008 | Ladstatter et al. | |
| 2008/0225549 A1* | 9/2008 | Dassanayake ....... | G02B 6/0008 362/555 |
| 2015/0060652 A1* | 3/2015 | Volfson ................. | G01J 1/0425 250/227.11 |
| 2018/0265220 A1* | 9/2018 | Li ........................... | B64D 47/06 |
| 2018/0274742 A1* | 9/2018 | Zhang .................. | G02B 6/0096 |
| 2019/0144132 A1* | 5/2019 | Jha ......................... | H05K 1/181 362/470 |

FOREIGN PATENT DOCUMENTS

| | | |
|---|---|---|
| EP | 4324752 | 2/2024 |
| KR | 20200013624 | 2/2020 |

* cited by examiner

AIRCRAFT LIGHT, AIRCRAFT COMPRISING AN AIRCRAFT LIGHT, AND METHOD OF MANUFACTURING AN AIRCRAFT LIGHT

CROSS-REFERENCE TO RELATED APPLICATIONS

This application claims priority to EP Patent Application No. 24163794.1, filed Mar. 15, 2024 and titled "AIRCRAFT LIGHT, AIRCRAFT COMPRISING AN AIRCRAFT LIGHT, AND METHOD OF MANUFACTURING AN AIRCRAFT LIGHT," which is incorporated by reference herein in its entirety for all purposes.

FIELD

The present invention relates to aircraft lighting. In particular, the present invention relates to an aircraft light. The present invention further relates to an aircraft comprising such an aircraft light and to a method of manufacturing an aircraft light.

BACKGROUND

Almost all aircraft are equipped with numerous lights, including exterior aircraft lights and interior aircraft lights. In particular, large passenger airplanes are provided with a wide variety of exterior and interior aircraft lights.

Exterior aircraft lights are employed for a wide variety of different purposes, such as for allowing the pilots and/or air crew to view the outside, for passive visibility, for signaling purposes, etc. Examples of such exterior light units are navigation lights, also referred to as position lights, red-flashing beacon lights, white strobe anti-collision lights, wing scan lights, engine scan lights, take-off lights, landing lights, taxi lights, runway turn-off lights, etc.

In order to ensure the safety and reliability of the aircraft, the operation of aircraft lights is frequently monitored by sensors, which are configured for detecting the light output of the respective aircraft light.

It may be necessary or desirable to install an aircraft light in a hostile environment, for example in a thermally challenging position, in particular at a position that becomes hot during the operation of the aircraft. Such positions may include positions in the vicinity of an exhaust which is provided for discharging hot gases to the environment. The high temperatures of the hot gases may adversely affect or even damage components of the aircraft light, such as the light source(s) and/or the light sensor(s) of an aircraft light.

Accordingly, it would be beneficial to provide an aircraft light, which allows for monitoring its operation and which allows for emitting light from hostile environments, such as hot portions of the aircraft, while keeping the risk of adversely affecting or damaging temperature sensitive components of the aircraft light low.

SUMMARY

Exemplary embodiments of the invention include an aircraft light comprising an arrangement of a plurality of light sources, which are arranged on a light source support; and a light guide, which is arranged vis-a-vis the plurality of light sources, for receiving and transmitting light emitted by the plurality of light sources. The light guide comprises: an optical fiber; a coupling portion provided at an input end of the optical fiber facing the plurality of light sources; and a light exit portion, providing light received and transmitted from the plurality of light sources at a light head of the aircraft light. The coupling portion comprises a plurality of legs, wherein each of the plurality of legs extends between the input end of the optical fiber and a respective one of the plurality of light sources for transmitting light emitted by the respective light source into the optical fiber.

The aircraft light further comprises a light sensor, which is arranged among the plurality of light sources, in particular among the plurality of light sources on the light source support, for detecting stray light, which is emitted by the plurality of light sources and which does not reach the optical fiber, because it is not being coupled into the optical fiber of the light guide.

The stray light may in particular include light that emerges from the interfaces between the plurality of light sources and the corresponding legs of the coupling portion and/or light that is deflected at the coupling interfaces between the plurality of light sources and the coupling portion of the light guide and/or light that escapes from the plurality of legs, before it enters the optical fiber.

Exemplary embodiments of the invention also include a method of manufacturing an aircraft light, wherein the method includes: arranging a plurality of light sources on a light source support; arranging a light sensor for detecting stray light among the plurality of light sources; arranging a light guide, comprising an optical fiber, vis-a-vis the plurality of light sources for receiving and transmitting light emitted by the plurality of light sources; providing a coupling portion at an input end of the optical fiber facing the plurality of light sources, wherein the coupling portion comprises a plurality of legs, with each of the plurality of legs extending between the input end of the optical fiber and a respective one of the plurality of light sources for transmitting light emitted by the respective light source into the optical fiber; and arranging a light exit portion of the light guide at a light head of the aircraft light for providing light, received and transmitted from the plurality of light sources, for a light output of the aircraft light.

In an aircraft light according to exemplary embodiments of the invention, the operation of the plurality of light sources may be monitored by the light sensor, in order to ensure a reliable operation of the aircraft light.

Further, due to the light guide, the light head of the aircraft light, i.e. the position at which the light is output from the aircraft light, may be located remote from the plurality of light sources and the light sensor.

This allows for placing the plurality of light sources and the light sensor in less hostile portions of the aircraft, in particular in portions of the aircraft, in which the temperatures are lower than at the position at which the light is output via the light head. As a result, an exterior aircraft light according to exemplary embodiments of the invention may allow for emitting light from hostile, in particular hot, portions of the aircraft, without negatively affecting thermally sensitive components, such as the plurality of light sources and the light sensor, of the aircraft light.

In an embodiment, the aircraft light further comprises an at least partially reflective cover, which covers the plurality of light sources, the light sensor, and/or the coupling portion. In an embodiment, the method of manufacturing an aircraft light comprises covering the plurality of light sources, the light sensor, and/or the coupling portion with an at least partially reflective cover.

The at least partially reflective cover may in particular be a dome-shaped cover, with the optical fiber and/or parts of the coupling portion extending through an opening formed in the dome-shaped cover. The opening may in particular be formed at the apex of the dome-shaped cover.

The at least partially reflective cover may reflect stray light, which is emitted by the plurality of light sources and which does not reach the optical fiber, towards the light sensor. As a result, the light sensor may receive a larger amount of stray light, and the efficiency and the reliability of the light sensor in detecting stray light may be enhanced.

In an embodiment, the at least partially reflective cover is diffusely reflective. The inside of the cover, facing the coupling portion and the plurality of light sources, may, for example, be white or it may be covered with a white coating, for diffusely reflecting the stray light towards the light sensor.

In another embodiment, the cover may be at least partially metallized and/or have a metallic coating, providing a more specular reflection of the stray light.

In an embodiment, the opening, which is formed within the cover, may be a channel or a bushing, extending through the cover for accommodating and supporting the optical fiber and/or parts of the coupling portion that extend through the cover.

In an embodiment, the plurality of light sources are arranged around a center portion of the arrangement of the plurality of light sources, and the light sensor may be arranged at the center portion of the arrangement of the plurality of light sources. The plurality of light sources may in particular be arranged in a circular arrangement, and the light sensor may be arranged at or in the vicinity of the center of said circular arrangement. Such an arrangement may allow for maximizing the distance between the light sensor and the plurality of light sources, which may reduce the amount of heat, which is transferred from the plurality of light sources to the light sensor, when the plurality of light sources are operated.

In an embodiment, each of the plurality of legs of the coupling portion has a transitioning cross-section along its length. Each of the plurality of legs may in particular may have a first cross-section at a distal end of the respective leg and a second cross-section at a proximal end of the respective leg, wherein the second cross-section is different from the first cross-section. The first cross-section may correspond to a light emission surface of the respective one of the plurality of light sources. The second cross-section may have the shape of a pizza slice or the shape of a slice of a pie.

The first cross-section may in particular be a rectangular cross-section, which may correspond to a rectangular light emission surface of the respective light source.

The plurality of pizza slices of the plurality of legs may jointly form a compound cross-section, corresponding to the cross-section of the optical fiber. In particular, the plurality of pizza slices of the plurality of legs may jointly form a circular compound cross-section, corresponding to a circular cross-section of the optical fiber.

Legs having a transitioning cross-section may allow for a very efficient transfer of light, emitted by the plurality of light sources, into the optical fiber. Legs having a transitioning cross-section may in particular allow for transferring the light, emitted by the plurality of light sources, into the optical fiber, without generating much stray light. In this way, the amount of light, which does not contribute to the light output of the aircraft light, may be kept low, and an overall high efficiency of the aircraft light may be achieved.

In an embodiment, the optical fiber is made of glass. An optical fiber made of glass may allow for a very efficient transfer of light with only small losses.

In an embodiment, the plurality of legs of the coupling portion are made of silicone. Silicone has been found to be a very suitable material for forming the legs of the coupling portion, as it has beneficial optical properties and may be easily formed into the desired shape of the plurality of legs.

In an embodiment, the optical fiber has a diameter in the range of between 4 mm and 8 mm, the optical fiber may in particular have a diameter of about 6 mm. A diameter of the optical fiber in the range of between 4 mm and 8 mm, in particular a diameter of about 6 mm, has been found to be well suited for transferring a suitable amount of light from the plurality of light sources to the light exit portion of the light guide, without adding too much weight to the aircraft light due to the weight of the optical fiber.

In an embodiment, the optical fiber has a length in the range of between 0.5 m and 2 m, in particular a length in the range of between 1 m and 1.5 m. A distance in the range of between 0.5 m and 2 m between the plurality of light sources and the light exit portion of the light guide has been found suitable for arranging the plurality of light sources in portions of the aircraft, in which they are not exposed to adverse environmental conditions, such as high temperatures, without adding too much weight to the aircraft light due to the weight of the optical fiber.

In an embodiment, the plurality of light sources comprise between 8 and 15 light sources, in particular between 10 and 12 light sources. Between 8 and 15 light sources, in particular between 10 and 12 light sources, have been found as well suited for providing desired light outputs of exterior aircraft lights, while allowing for a good coupling of light into the optical fiber via the plurality of legs.

In an embodiment, the plurality of light sources are a plurality of LEDs. LEDs provide reliable and efficient light sources at reasonable costs. Also, LEDs provide for well-behaved light emission surfaces, which allow for good coupling of light into the optical fiber via the plurality of legs.

In an embodiment, the plurality of light sources comprise at least two different subsets of light sources. The at least two different subsets of light sources may be selectively operable for providing at least two different lighting functionalities.

A first subset of light sources may, for example, be configured for providing navigation lighting, in particular red, green or white navigation lighting. A second subset of light sources may, for example, be configured for providing anti-collision lighting, in particular white strobe anti-collision lighting.

In an embodiment, the plurality of light sources are arranged in an arrangement that results in a distribution of heat, which is generated when the plurality of light sources are operated, which is as uniform as possible. A heat distribution with a high level of uniformity may allow for preventing the generation of "hot spots" within the aircraft light. "Hot spots" are regions having high temperatures, which may deteriorate or even damage the plurality of light source and/or the light sensor. A uniform heat distribution may further allow for dissipating the heat, which is generated by the plurality of light sources, more efficiently.

In an embodiment, the light sources of a first subset of light sources, associated with a first lighting functionality, may be spread out in the arrangement of the plurality of light sources, and the light sources of a second subset of light sources, associated with a second lighting functionality, may be placed in between the light sources of the first subset of light sources. In an embodiment, the plurality of light sources may be configured for emitting light having the same color.

Alternatively, the plurality of light sources may be configured for emitting light having different colors. This may allow for changing the color of the light output of the aircraft light by selectively activating different light sources of the plurality of light sources.

The plurality of light sources may in particular include at least two subsets of light sources, wherein all light sources of the same subset are configured for emitting light having the same color, and wherein the light sources of different subsets are configured for emitting light having different colors.

In an embodiment, the aircraft light further comprises an optical system, which is arranged at the light exit portion of the light guide at the light head for shaping a light output of the aircraft light. The optical system may in particular comprise at least one lens and/or at least one reflector and/or at least one shutter for shaping the light output.

The at least one lens and/or the at least one reflector and/or the at least one shutter may be made of heat resistant materials, which are able to withstand high temperatures at thermally challenging locations. The at least one lens may, for example, be made of glass, and the at least one reflector and/or the at least one shutter may, for example, be made of glass and/or metal.

In an embodiment, the aircraft light further comprises a controller, which is coupled to the light sensor for receiving sensor data from the light sensor. The controller may be configured for determining a performance level of the plurality of light sources from the sensor data received from the light sensor. The controller may in particular be configured to detect and to communicate a near end of life condition ("NEOL condition") of one or more of the plurality of light sources based on the sensor data received from the light sensor.

The controller may allow for a reliable operation of the aircraft light. The detection and communication of a near end of life condition may in particular allow for replacing the aircraft light or at least one light source of the aircraft light, when one or more of the plurality of light sources have reached a near end of life condition. In this way, the risk of failure of the respective light source(s) and the risk of a highly substandard performance of the aircraft light is considerably decreased.

In an embodiment, the light sensor for detecting the stray light is a dedicated light sensor, such as a photo-resistor, a photo-diode or a photo-transistor. A dedicated light sensor may provide a very efficient and reliable light detector.

In an embodiment, the controller may use one or more of the plurality of light sources for communicating a near end of life condition and/or another determination on the basis of the sensor data. For example, when the controller detects a near end of life condition of one or more light sources, the controller may operate a predetermined one of the plurality of light sources, having a particular color, when on the ground. In this way, the light output of the aircraft light may be used as a signal to the ground personal that a closer inspection and/or maintenance and/or replacement of the aircraft light is due.

In an embodiment, the controller is coupled to an on-board communication network.

In addition, alternatively, the controller may be accessible via a ground-operated inspection/maintenance tool, e.g. in a wireless manner. In this way, the controller may be embedded in a suitable communication infrastructure for conveying its findings.

In an embodiment, the aircraft light is an exterior aircraft light.

The exterior aircraft light may in particular be a wing tip navigation light or a tail navigation light or a white wing tip strobe anti-collision light or a white tail strobe anti-collision light or a red-flashing beacon light or a logo light or a wing scan light or an engine scan light or a cargo loading light or an auxiliary power unit inspection light, which may be arranged in an auxiliary power unit bay. The exterior aircraft light may also be an aircraft headlight, for example an aircraft landing light or an aircraft take-off light or an aircraft taxi light or an aircraft runway turn-off light.

The exterior aircraft light may further be a multi-functional exterior aircraft light, which has the functionalities of at least two of a wing tip navigation light, a tail navigation light, a white wing tip strobe anti-collision light, a white tail strobe anti-collision light, a red-flashing beacon light, a logo light, a wing scan light, an engine scan light, a cargo loading light, an auxiliary power unit inspection light, an aircraft landing light, an aircraft take-off light, an aircraft taxi light, and an aircraft runway turn-off light.

In an embodiment, the exterior aircraft light is a combined tail navigation light and white tail strobe anti-collision light.

An aircraft light according to an exemplary embodiment of the invention may also be an interior aircraft light, such as a reading light or a wash light for illuminating a wall within an aircraft cabin. Also in such applications, it may be beneficial to spatially separate the light emission from the light generation.

Exemplary embodiments of the invention further include an aircraft, such as an airplane or a helicopter, which is equipped with at least one aircraft light according to an exemplary embodiment of the invention. The additional features, modifications and effects, as described above with respect to an aircraft light and/or with respect to a method of manufacturing an aircraft light, apply to the aircraft in an analogous manner.

BRIEF DESCRIPTION OF THE DRAWINGS

Further exemplary embodiments of the invention are described below with respect to the accompanying drawings, wherein.

DETAILED DESCRIPTION

Figure 1A:
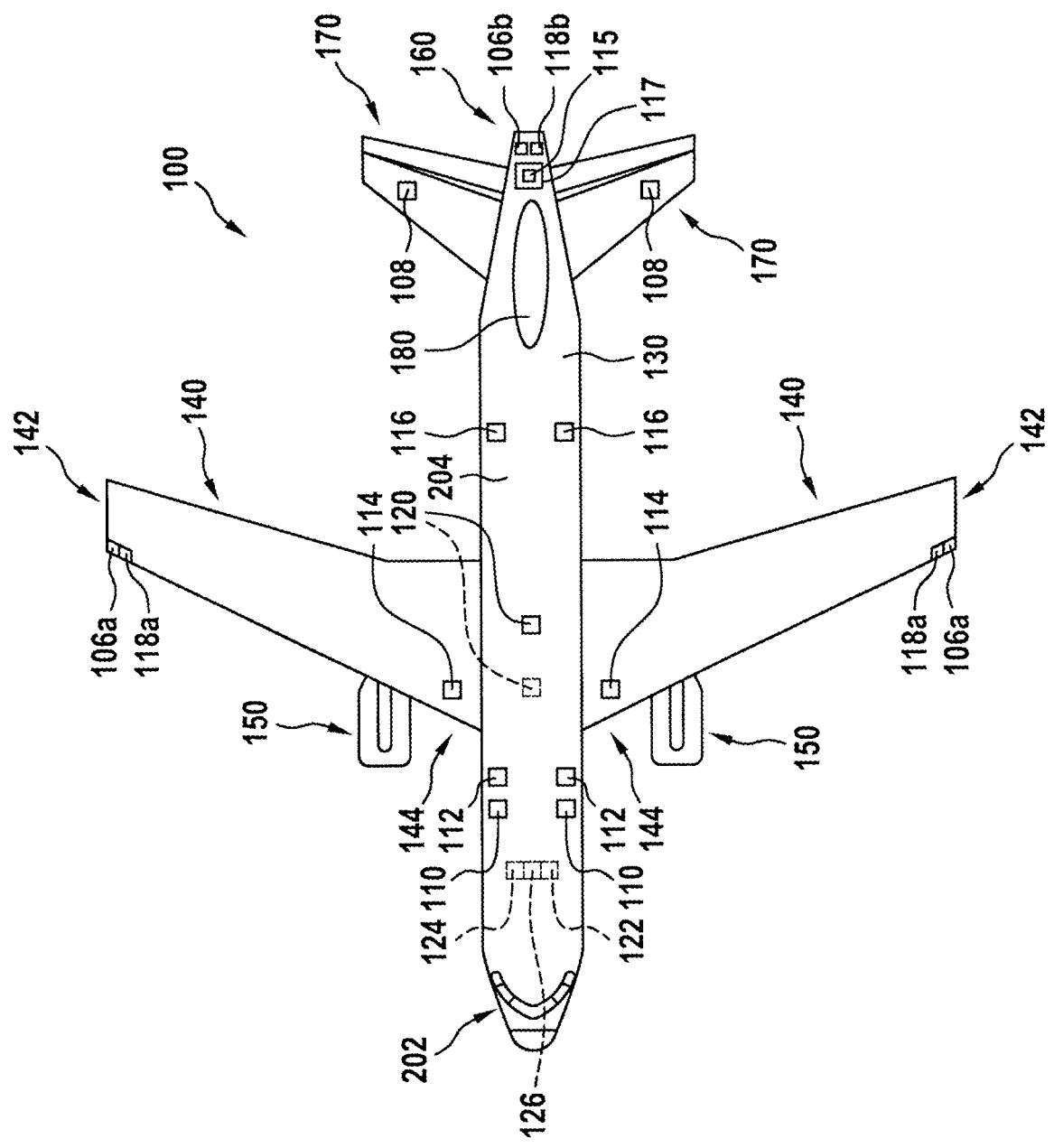
FIG. 1A shows a schematic top view of an aircraft, which is equipped with a variety of exterior aircraft lights.
Figure 1B:
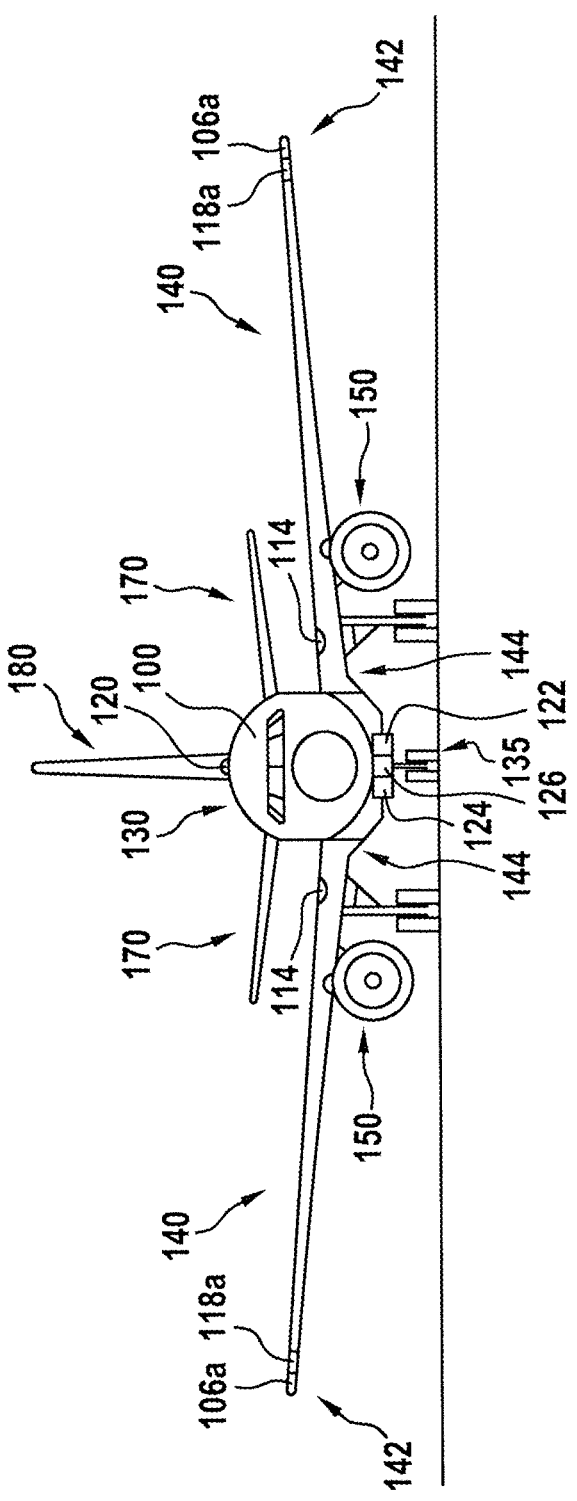
FIG. 1B shows a schematic front view of the aircraft shown in FIG. 1A.

FIGS. 1A and 1B, jointly referred to as FIG. 1 herein, show an aircraft 100, in particular an airplane, comprising a fuselage 130, which houses a cockpit 202 and a passenger cabin 204, and two wings 140, extending from the fuselage 130. Two horizontal stabilizers 170 and a vertical stabilizer 180 extend from a rear portion of the fuselage 130. An engine 150 is mounted to each of the wings 140, respectively. The aircraft 100 is shown in a top view in FIG. 1A and shown in a front view in FIG. 1B.

The aircraft 100 of FIG. 1 is equipped with a wide variety of exterior aircraft lights. In particular, the aircraft 100 is equipped with two wing tip navigation lights 106*a*, a tail navigation light 106*b*, two logo lights 108, two wing scan lights 110, two engine scan lights 112, two runway turn-off lights 114, two cargo loading lights 116, two white wing tip strobe anti-collision lights 118*a*, a white tail strobe anti-collision light 118*b*, two red-flashing anti-collision beacon lights 120, a landing light 122, a take-off light 124, and a taxi light 126. It is pointed out that these kinds of lights and their numbers are exemplary only and that the aircraft 100 may be equipped with additional lights that are not shown.

The three navigation lights 106*a*, 106*b* are positioned in the left and right wing tips 142 as well as at the tail 160 of the aircraft 100. In normal flight conditions, each one of the navigation lights 106*a*, 106*b* emits light in one of the colors green, red and white, thus indicating to the aircraft environment if they are looking at the port side, starboard side or tail side of the aircraft. The navigation lights 106*a*, 106*b* are normally on during all phases of the flight and in all flight conditions.

The logo lights 108 are directed to the vertical stabilizer 180 of the aircraft 100 and are provided for illuminating the same, in particular for illuminating the logo commonly provided on the vertical stabilizer 180. The logo lights 108 are normally switched on for the entire duration of the flight during night flights. It is also possible that the logo lights are only used during taxiing on the airport and are normally switched off during the flight.

The wing scan lights 110 and the engine scan lights 112 are positioned on the left and right sides of the fuselage 130, in front of the roots 144 of the wings 140 of the aircraft 100. The wing scan lights 110 and the engine scan lights 112 are normally off during the flight and may be switched on periodically or upon reasonable cause by the pilots or by the aircrew, in order to check the wings 140 and the engines 150 of the aircraft 100.

The runway turn-off lights 114 are positioned in the roots 144 of the wings 140. The runway turn-off lights 114 are directed forwards and are normally switched off during the flight and switched on during taxiing, at least at night.

The cargo loading lights 116 are positioned on the left and right sides of the fuselage 130, behind the wings 140 and in front of the tail structure of the aircraft 100. They are normally switched off during the flight of the aircraft 100.

The white wing tip strobe anti-collision lights 118*a* are positioned in the left and right wing tips 142. The white tail strobe anti-collision light 118*b* is positioned at the tail 160 of the aircraft 100. The white strobe anti-collision lights 118*a*, 118*b* emit respective sequences of white light flashes during normal operation of the aircraft 100. It is also possible that the white strobe anti-collision lights 118*a*, 118*b* are only operated during night and in bad weather conditions.

The red-flashing anti-collision beacon lights 120 are positioned on the top and the bottom of the fuselage 130 of the aircraft 100. They are arranged at the height of the wings in the longitudinal direction of the aircraft 100. While one of the red-flashing anti-collision beacon lights 120 is disposed on the top of the fuselage 130, the other one of the red-flashing anti-collision beacon lights 120 is disposed on the bottom of the fuselage 130 and is therefore shown in phantom in FIG. 1A. The red-flashing anti-collision beacon lights 120 are normally switched on during taxiing and during take-off and landing. Their output is perceived as a sequence of red light flashes in a given viewing direction.

In the embodiment depicted in FIGS. 1A and 1B, the runway turn-off lights 114 are located in the wings 140, in particular in the roots 144 of the wings 140, and the landing light 122, the take-off light 124 and the taxi light 126 are mounted to the front gear 135 of the aircraft 100. The front gear 135 is stored within the fuselage 130 of the aircraft 100 during flight, and it is deployed during landing, taxiing and take off.

In alternative embodiments, which are not explicitly shown in the figures, the runway turn-off lights 114 may be mounted to the front gear 135 and/or at least one of the landing light 122, the take-off light 124 and the taxi light 126 may be installed in the wings 140, in particular in the roots 144 of the wings 140, of the aircraft 100.

The aircraft 100 may also comprise one or more multi-functional lights, which combine(s) the functionalities of at least two of a landing light, a take-off light, a taxi light, a runway turn-off light, a navigation light, a white strobe anti-collision light, and a red-flashing beacon light. In particular, the aircraft 100 may comprise one or more combined navigation and white strobe anti-collision lights, such as a combined white tail navigation light and white tail strobe anti-collision light and/or a combined red wing tip navigation light and white wing tip strobe anti-collision light and/or a combined green wing tip navigation light and white wing tip strobe anti-collision light.

Since the landing light 122, the take-off light 124, and the taxi light 126 are arranged on the bottom of the aircraft 100, they are also depicted in phantom in FIG. 1A.

Figure 2:
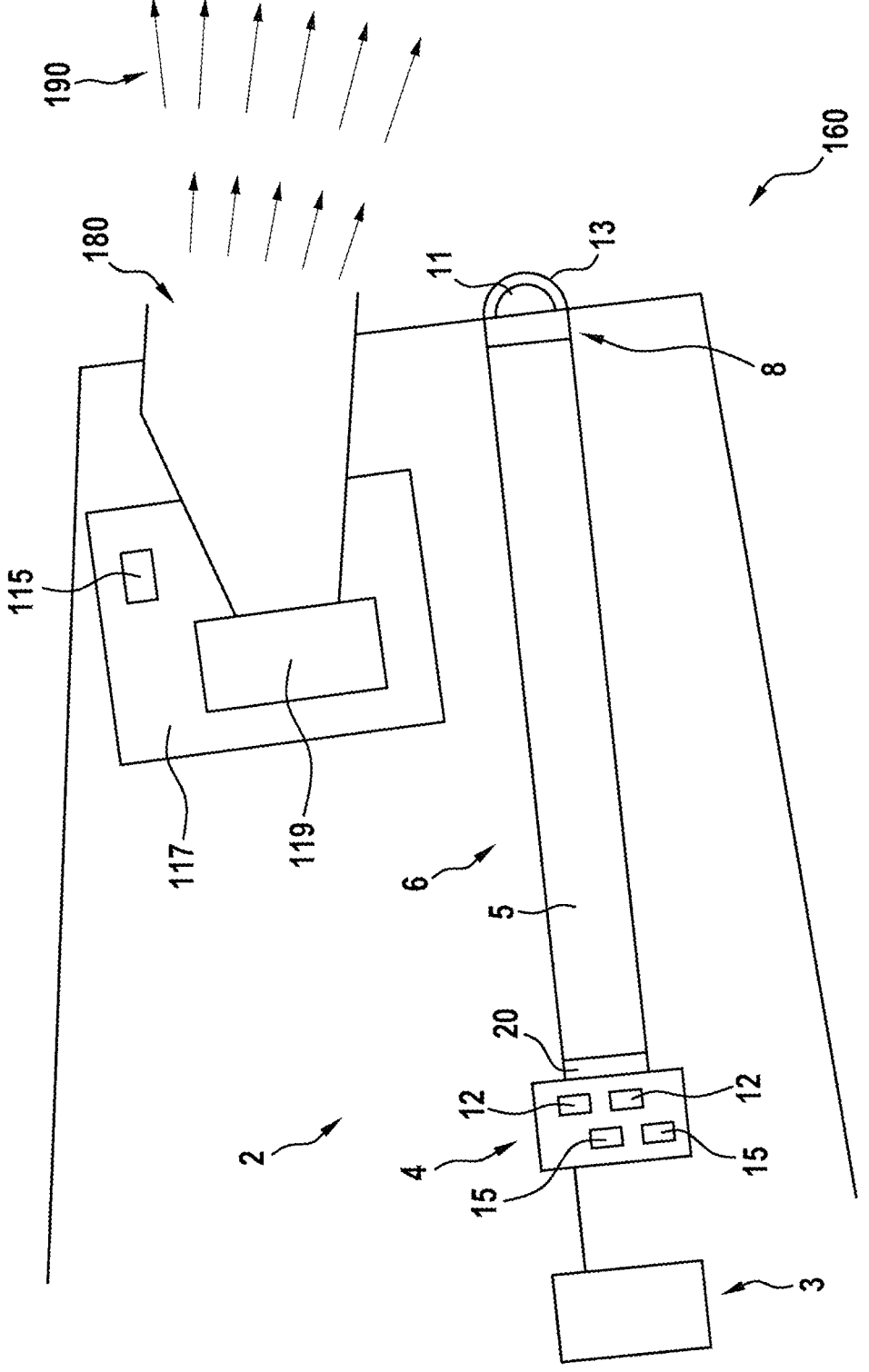
FIG. 2 shows a schematic cross-sectional view of the tail portion of the aircraft, with an aircraft light according to an exemplary embodiment of the invention being arranged at the tail portion.

FIG. 2 shows a schematic cross-sectional view of the tail 160 of an aircraft according to an exemplary embodiment of the invention, the aircraft including an aircraft light 2 according to an exemplary embodiment of the invention arranged at said tail 160. The aircraft of FIG. 2 may be the aircraft 100 of FIG. 1 or may be another aircraft. The aircraft light 2 may, for example, be a white tail strobe anti-collision light 118*b* or a tail navigation light 106*b* or a combined white tail strobe anti-collision light and tail navigation light.

In addition to the aircraft light 2, an exhaust 180, for example an exhaust of an auxiliary power unit (APU) 119, which is located in an auxiliary power unit bay 117, is provided at the tail 160 of the aircraft 100. When the auxiliary power unit 119 is operating, hot exhaust gases 190 from the auxiliary power unit 119 exit via the exhaust 180.

Since the light output portion of the aircraft light 2 is located in the vicinity of the exhaust 180, the light output portion of the aircraft light 2 may be exposed to high temperatures caused by the hot gases 190 exiting through the exhaust 180. High temperatures may be detrimental to the lifetime of the light sources and further electronic components of an aircraft light.

The aircraft light 2, which is in accordance with an exemplary embodiment of the invention, comprises a light generating portion 4, including a plurality of light sources 12 and, optionally, further electronic components 15 of the aircraft light 2. The light generating portion 4 is arranged in some distance from the exhaust 180. In consequence, the light generating portion 4 is not exposed to the high temperatures of the hot gases 190, exiting via the exhaust 180.

The aircraft light 2 further comprises a light guide 6 with a coupling portion 20 at a first end, facing the plurality of light sources 12, and a light exit portion 8 at an opposite second end of the light guide 6.

The coupling portion 20 is configured for receiving light, emitted by the plurality of light sources 12, and for transmitting said light into the light guide 6.

Light from the plurality of light sources 12, which is transmitted into the light guide 6, is output through the light exit portion 8 of the light guide 6.

The light guide 6 comprises an optical fiber 5, extending between the coupling portion 20 and the light exit portion 8. The optical fiber 5 may be a single optical fiber or may be a plurality of optical fibers arranged in series and/or in parallel between the coupling portion 20 and the light exit portion 8.

The optical fiber 5 may be made of glass or another suitable light guiding material.

The optical fiber 5 may have a length in the range of between 0.5 m and 2 m, in particular a length in the range of between 1 m and 1.5 m.

The optical fiber 5 may have a diameter in the range of between 4 mm and 8 mm. The optical fiber 5 may in particular have a diameter of about 6 mm.

The light transmitted through the optical fiber 5 may be provided to a light head 9 of the aircraft light 2. In particular, the light head 9 may be provided at the light exit portion 8 of the light guide 6.

The light head 9 may comprise an optical system for shaping a light output of the aircraft light 2. In the exemplary embodiment of FIG. 2, the light head 9 comprises a lens 11 for shaping the light output of the aircraft light 2. A light transmissive, protective cover 13 is arranged over the lens 11. The light from the light guide 6 exits the light guide 6 at the light exit portion 8 and enters the lens 11. The lens 11 may be in direct contact with the light exit portion 8 of the light guide 6 or may be spaced from the light exit portion 8 of the light guide 6. The lens 11 shapes the light output of the aircraft light 2, which leaves the aircraft light 2 through the light transmissive, protective cover 13. In general, the optical system may comprise one or more optical elements and may comprise at least one lens and/or at least one reflector and/or at least one shutter.

The optical element(s) of the optical system, i.e. the at least one lens and/or the at least one reflector and/or the at least one shutter, as well as the light transmissive, protective cover 13 may be made from temperature resistant materials, in order to withstand high temperatures at thermally challenging locations, such as in the vicinity of the exhaust 180, as depicted in FIG. 2. The lens 11 may in particular be made from glass. A reflector could be made from coated glass and/or metal.

With the light generating portion 4 being arranged remote from the light head 9, the light head 9 does not comprise highly temperature sensitive components and may be located in hot portions of the aircraft 100, in particular in the vicinity of the exhaust 180 at the end of the tail 160 of the aircraft 100, without the heat from the exhaust compromising the lifetime of the aircraft light. As compared to previous approaches, where all components of the aircraft light were arranged in the vicinity of the exhaust, the lifetime of the aircraft light can be significantly increased.

The aircraft light 2 further comprises a controller 3, for controlling the operation of the aircraft light 2.

Figure 3:
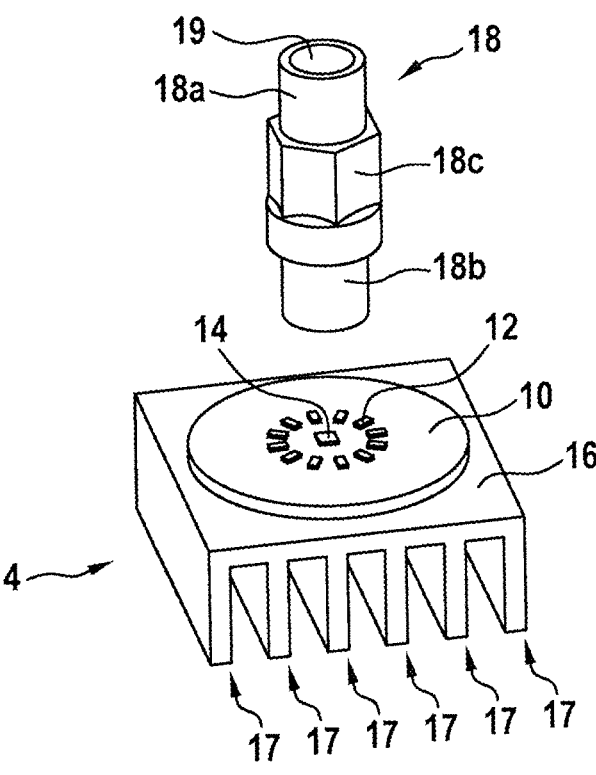
FIGS. 3 and 4 depict schematic perspective views of selected components of an aircraft light according to an exemplary embodiment of the invention.
Figure 4:
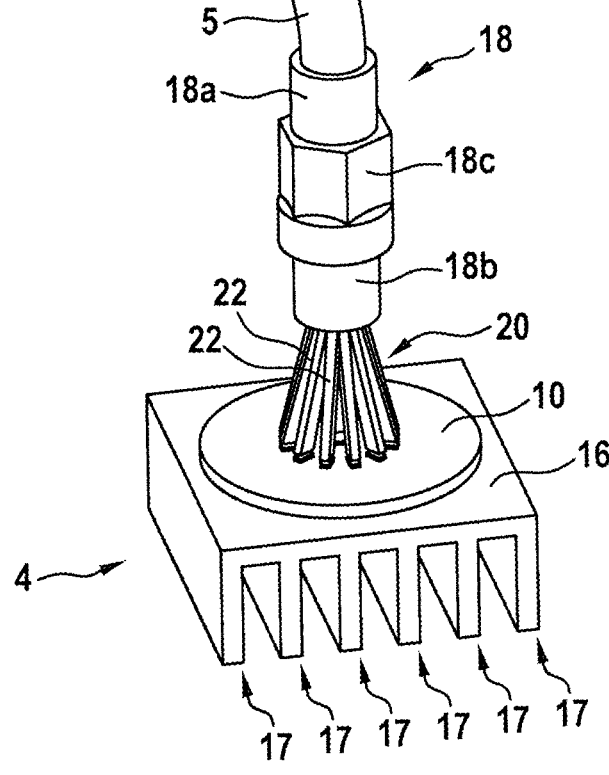

FIGS. 3 and 4 depict schematic perspective views of selected components of an aircraft light 2 according to an exemplary embodiment of the invention. In particular, FIGS. 3 and 4 depict schematic perspective views of a light generating portion 4, a connector 18, and part of a light guide of an aircraft light 2 according to an exemplary embodiment of the invention. The depicted components may be components of the aircraft light 2 of FIG. 2 of may be components of another aircraft light 2 in accordance with an exemplary embodiment of the invention.

The light generating portion 4 comprises a light source support 10, for example a printed circuit board (PCB), and a plurality of light sources 12, which are arranged on and supported by the light source support 10. The plurality of light sources 12 may in particular be LEDs. The plurality of light sources 12 may comprise at least two different subsets of light sources 12, wherein the at least two different subsets of light sources 12 may be selectively operable by the controller 3 for providing at least two different lighting functionalities. The plurality of light sources 12 may, for example, include a first subset of light sources, which are configured for providing navigation lighting, and a second subset of light sources, which are configured for providing anti-collision lighting, in particular white strobe anti-collision lighting.

All of the plurality of light sources 12 may be configured for emitting light having the same color. For the exemplary case of a combined tail navigation light and white tail strobe anti-collision light, all of the plurality of light sources 12 may be white light sources.

Alternatively, the plurality of light sources 12 may be configured for emitting light having different colors.

The plurality of light sources 12 may in particular include at least two subsets of light sources, wherein all light sources of the same subset are configured for emitting light having the same color, and wherein the light sources of different subsets are configured for emitting light having different colors.

For the exemplary case of a combined wing tip navigation and anti-collision light, the at least two subsets may, for example, include a first subset of light sources, which are configured for emitting green light for operating the aircraft light as a starboard navigation light 106a, and second subset of light sources 12, which are configured for emitting red light for operating the aircraft light as a portside navigation light 106a. The at least two subsets may further include a third subset of light sources 12, which are configured for emitting white light for operating the aircraft light as a white wing tip strobe anti-collision light 118a.

In operation, different light sources may generate different amounts of heat. In particular, light sources for different lighting functionalities may have different light intensities and may differ considerably in terms of their heat generation. In the case of different levels of heat generation, the different kinds of light sources may be arranged in a configuration on the light source support 10, which results in a distribution of heat, which is as uniform as possible, in order to avoid the generation of "hot spots" within the aircraft light 2, which may deteriorate the light sources due to overheating. For example, in the case of two high intensity light sources being provided, they may be arranged with a maximum distance among them in the arrangement of light sources.

The light generating portion 4 further comprises a light sensor 14, which is arranged among the plurality of light sources 12.

In the embodiment depicted in FIGS. 3 and 4, the light sensor 14 is arranged at a center of the light source support 10, and the plurality of light sources 12 are arranged in a circular arrangement, with the light sensor 14 being positioned at the center of the circular arrangement of light sources 12.

Such a configuration allows for arranging the light sensor 14 in some distance from the plurality of light sources 12. This may help to prevent the light sensor 14 from being adversely affected by heat, which is generated by the plurality of light sources 12 in operation.

The light sensor 14 may be configured for detecting stray light, which is emitted by the plurality of light sources 12, but does not reach the optical fiber 5, as it is not coupled into the optical fiber 5 of the light guide 6.

The controller 3 of the aircraft light 2 may be coupled to the light sensor 14 for receiving sensor data provided by the light sensor 14. The controller 3 may be configured for determining a performance level of the plurality of light sources 12 from the sensor data received from the light sensor 14. The controller 3 may in particular be configured for detecting and communicating a near end of life condition ("NEOL condition") of one or more of the plurality of light sources 12.

The controller 3 may be configured for issuing an alarm, in case a near end of life condition has been detected. The alarm may be a visual alarm or a signal to an entity outside of the aircraft light 2, such as a signal to a central on-board computer of the aircraft or to an inspection/maintenance tool.

The light sensor 14 may be a dedicated light sensor 14, such as a photo-detector, in particular a semiconductor photo-detector, such as a photo-resistor, a photo-diode or a photo-transistor.

In the embodiment depicted in FIGS. 3 and 4, the light generating portion 4 comprises twelve light sources 12. The number of twelve light sources 12 is, however, depicted only as an example, and the light generating portion 4 may comprise different numbers of light sources 12 as well.

In the embodiment depicted in FIGS. 3 and 4, the light source support 10 is a circular disk. The circular disk is, however, depicted only as an example, and the light source support 10 may have a different shape, for example a rectangular shape, in particular a quadratic shape.

In the embodiment depicted in FIGS. 3 and 4, the light source support 10 is arranged on a heat sink 16. The heat sink 16 comprises a plurality of cooling ribs 17, extending from the side of the heat sink 16, which is opposite to the light source support 10.

On the side of the light source support 10, a connector 18 is provided in some distance from the light source support 10. In the orientation of the light generating portion 4, depicted in FIGS. 3 and 4, the connector 18 is arranged above the light source support 10 and the plurality of light sources 12.

The connector 18 comprises an opening or bore 19 for receiving the optical fiber 5 from a side facing away from the light source support 10. The optical fiber 5 is only depicted in FIG. 4. The optical fiber 5 may be a glass fiber or another suitable optical fiber.

In the embodiment depicted in FIGS. 3 and 4, the connector 18 has a basically cylindrical shape. In particular, the connector 18 comprises two cylindrical end portions 18a, 18b and a central portion 18c. The central portion 18c is formed between the two cylindrical end portions 18a, 18b and has a hexagonal cross-section. The configuration of the connector 18, depicted in the figures, is only an example, and other shapes of the connector are possible as well.

For transmitting light, which is emitted by the plurality of light sources 12, into the optical fiber 5, a light coupling portion 20 extends between the connector 18 and the plurality of light sources 12.

The light coupling portion 20 is depicted in FIG. 4. In order to provide an unobstructed view onto the light sensor 14 and the plurality of light sources 12, the light coupling portion 20 is not depicted in FIG. 3.

The light coupling portion 20 and the optical fiber 5 are optically coupled with each other inside the connector 18.

For transmitting light, which is emitted by the plurality of light sources 12, into the optical fiber 5, the light coupling portion 20 comprises a plurality of legs 22.

Each of the plurality of legs 22 extends between a light input end of the optical fiber 5, which is located inside the connector 18, and a respective one of the plurality of light sources 12.

The light coupling portion 20 may be made of silicone or another light transmissive and light guiding material.

Figure 5:
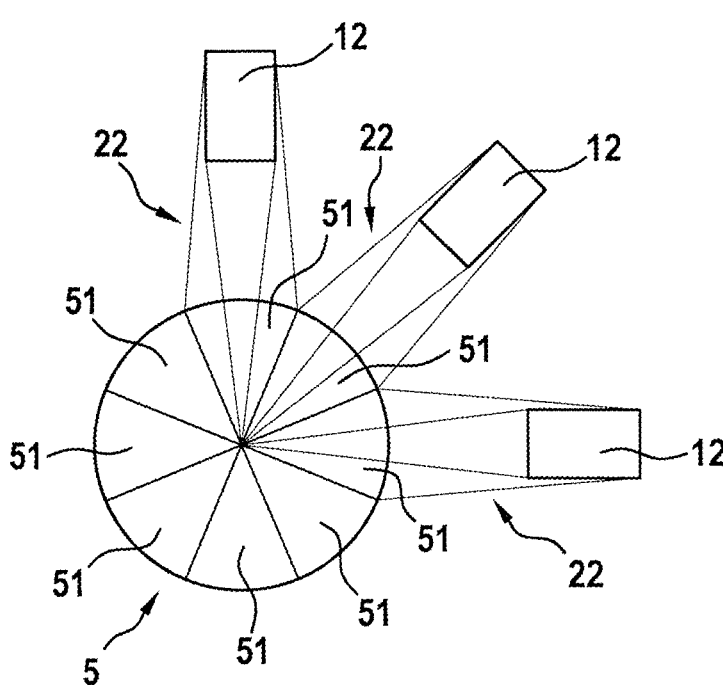
FIG. 5 schematically illustrates a plurality of legs, extending between a plurality of light sources and an optical fiber of an aircraft light according to an exemplary embodiment of the invention.

FIG. 5 schematically illustrates the plurality of legs 22 of the coupling portion 20, extending between the plurality of light sources 12 and the light input end of the optical fiber 5.

As schematically illustrated in FIG. 5, each of the plurality of legs 22 has a transitioning cross-section along its length. Each of the plurality of legs 22 has, in particular, a distal end, facing one of the plurality of light sources 12, and a proximal end, facing the light input end of the optical fiber 5.

At its distal end, each of the plurality of legs 22 may have a first cross-section, corresponding to a light emission surface of the respective light source 12. The first cross-section may in particular be rectangular, in correspondence with a rectangular light emission surface of the respective light source 12.

At its proximal end, each of the plurality of legs 22 may have a second cross-section in the shape of a pizza slice or a slice of a pie, for transmitting the light, which is emitted by the respective light source 12, into the optical fiber 5 via a corresponding section 51 of an end face at the light input end of the optical fiber 5.

The plurality of the pizza slices jointly form a compound cross-section, corresponding to the circular cross-section of the optical fiber 5.

Figure 6:
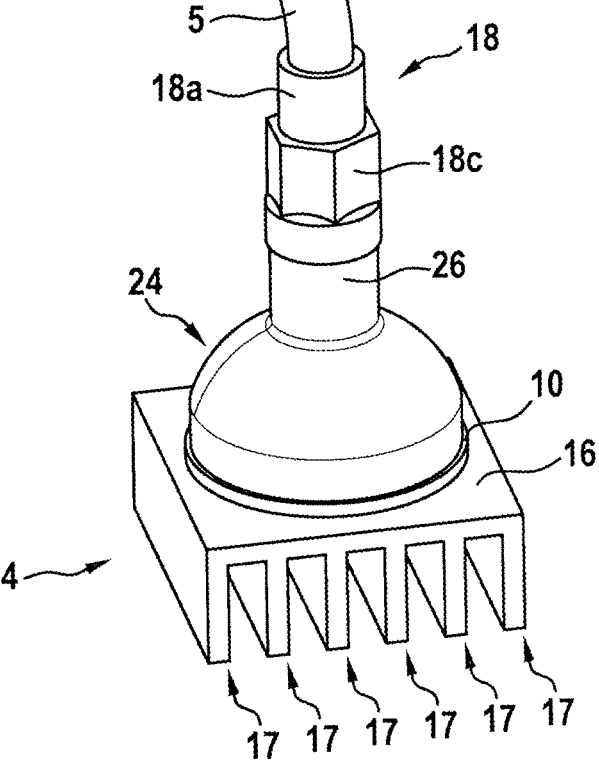
FIG. 6 depicts a schematic perspective view of selected components of an aircraft light according to another exemplary embodiment of the invention.

FIG. 6 depicts a schematic perspective view of selected components of an aircraft light 2 according to another exemplary embodiment of the invention. Similar to the view of FIGS. 3 and 4, the light generating portion 4, the connector 18, and the optical fiber 5 are shown. Those components are identical to the components depicted in FIGS. 3 and 4, and reference is made to their description above. In the embodiment depicted in FIG. 6, a non-light-transmissive cover 24 covers the plurality of light sources 12, the light sensor 14, and the coupling portion 20. In consequence, the plurality of light sources 12, the light sensor 14, and the coupling portion 20 are not visible in FIG. 6.

In the exemplary embodiment of FIG. 6, the cover 24 is at least partially reflective on its inside. The cover 24 is arranged for reflecting stray light, which is emitted by the plurality of light sources 12 and which does not reach the optical fiber 5, as it is not being coupled into the optical fiber 5 of light guide 6, within the enclosure formed by the cover 24 over the light source support 10. In particular, the cover 24 may reflect stray light towards the light sensor 14.

The stray light may in particular include light that exits from lateral side portions of the plurality of legs 22 of the coupling portion 20 and/or from the optical interfaces between the plurality of light sources 12 and the corresponding plurality of legs 22. The stray light may in particular include light that is deflected at the coupling interfaces between the plurality of light sources 12 and the corresponding plurality of legs 22.

Arranging an at least partially reflective cover 24 over the plurality of light sources 12 and the plurality of legs 22 of the coupling portion 20, as it is depicted in FIG. 6, may allow for increasing the amount of light that reaches the light sensor 14. In this way, the sensor data from the light sensor 14 may allow for a more reliable and/or more accurate determination of the performance of the plurality of light sources from the detected stray light.

In order to obtain a particularly complete picture about the performance of the plurality of light sources, it is possible to operate them one-by-one is a test run and to compare the sensor data with historical sensor data for the individual light sources. It is also possible to look at all light sources of a particular lighting functionality together by obtaining sensor data for each of the different lighting functionalities. In this way, the performance may be evaluated on a lighting functionality level. It is understood that various kinds of evaluations may be carried out with the disclosed set-up, depending on which sets of light sources are operated for the respective evaluations.

The cover 24 is at least partially reflective. In particular, the cover 24 may be diffusely reflective. The inside of the cover 24, facing the coupling portion 20 and the plurality of light sources 12, may in particular be white or may be covered with a white coating for diffusely reflecting the stray light towards the light sensor 14.

The cover 24 may also be at least partially metallized and/or have a metallic coating, resulting in a more specular reflection.

Both in case of the diffusely reflective cover and in case of the metallized cover, the stray light may reach the light sensor 14 after one reflection or after two or more reflections.

In the embodiment depicted in FIG. 6, the cover 24 is a dome-shaped cover. The connector 18, which houses abutting ends of the coupling portion 20 and the optical fiber 5, extends through an opening formed in the dome-shaped cover 24. The connector 18 may in particular extend though an opening, which is formed at the apex of the cover 24.

In the embodiment depicted in FIG. 6, a tube shaped portion 26, providing a channel through the cover 24, is formed at the apex of the cover 24. The cylindrical end portion 18b of the connector 18, facing the plurality of light sources 12, may be introduced into said channel for coupling the connector 18 with the cover 24.

Such a configuration may provide for a mechanically stable coupling between the connector 18 and the cover 24. The coupling may be configured so that it does not allow stray light to exit the enclosure defined by the cover 24.

Although FIG. 2 shows a schematic cross-sectional view of the tail 160 of an aircraft 100, an aircraft light according to exemplary embodiments of the invention can be provided at other positions of the aircraft. In other words, exemplary embodiments of the invention are not restricted to aircraft lights located at the tail 160 of the aircraft 100.

An aircraft light 2 according to an exemplary embodiment of the invention may also be a wing tip navigation light 106a or a white wing tip strobe anti-collision light 118a or a red-flashing beacon light 120 or a logo light 108 or a wing scan light 110 or an engine scan light 112 or a cargo loading light 116 or an auxiliary power unit inspection light 115, which is arranged in an auxiliary power unit bay 117 within the fuselage 130 of the aircraft 100.

An aircraft light 2 according to an exemplary embodiment of the invention may further be an aircraft headlight, for example an aircraft landing light 122 or an aircraft take-off light 124 or an aircraft taxi light 126 or an aircraft runway turn-off light 114.

An aircraft light 2 according to an exemplary embodiment of the invention may further be a multi-functional exterior aircraft light, having the functionalities of at least two of a wing tip or tail navigation light 106a, 106b, a white wing tip or tail strobe anticollision light 118a, 118b, a red-flashing beacon light 120, a logo light 108, a wing scan light 110, an engine scan light 112, a cargo loading light 116, an auxiliary power unit inspection light 115, an aircraft landing light 122, an aircraft take-off light 124, an aircraft taxi light 125, and an aircraft runway turn-off light 114.

An aircraft light 2 according to an exemplary embodiment of the invention may also be an interior aircraft light, such as a reading light or wash light for illuminating an inner wall of an aircraft cabin. An aircraft light 2 according to an exemplary embodiment of the invention allows spatially separating the location at which the light is output from the aircraft light 2 from the location at which the light is generated. This may provide more flexibility in installing the aircraft light 2 as an interior aircraft light within an aircraft 100.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

What is claimed is:

1. An aircraft, comprising:
   an arrangement of a plurality of light sources configured to be located in a vicinity of an exhaust at a tail of the aircraft, arranged on a light source support; and
   a light guide arranged for receiving and transmitting light emitted by the plurality of light sources;
   wherein the light guide comprises:
   an optical fiber;
   a coupling portion provided at an input end of the optical fiber facing the plurality of light sources, the coupling portion comprising a plurality of legs, with each of the plurality of legs extending between the input end of the optical fiber and a respective one of the plurality of light sources; and
   a light exit portion, providing light received and transmitted from the plurality of light sources at a light head of the aircraft light; and
   wherein the aircraft light further comprises:
   a light sensor, which is arranged among the plurality of light sources for detecting stray light, emitted by the plurality of light sources and not reaching the optical fiber.

2. The aircraft according to claim 1, further comprising an at least partially reflective cover, covering the plurality of light sources, the light sensor, and the coupling portion; wherein the at least partially reflective cover is in particular a dome-shaped cover, with the optical fiber and/or parts of the coupling portion extending through an opening formed in the dome-shaped cover.

3. The aircraft according to claim 1, wherein the plurality of light sources are arranged around a center portion of the arrangement of the plurality of light sources, and wherein the light sensor is arranged at the center portion.

4. The aircraft light according to claim 1, wherein each of the plurality of legs of the coupling portion has a transitioning cross-section along its length, wherein each of the plurality of legs in particular has, at its distal end, a first cross-section corresponding to a light emission surface of the respective one of the plurality of light sources and, at its proximal end, a second cross-section in the shape of a pizza slice.

5. The aircraft according to claim 1,
wherein the optical fiber is made of glass; and/or
wherein the plurality of legs of the coupling portion are made of silicone.

6. The aircraft according to claim 1,
wherein the optical fiber has a diameter in the range of between 4 mm and 8 mm, wherein the optical fiber in particular has a diameter of about 6 mm; and/or
wherein the optical fiber has a length in the range of between 0.5 m and 2 m, in particular a length in the range of between 1 m and 1.5 m.

7. The aircraft according to claim 1,
wherein the plurality of light sources comprise between 8 and 15 light sources, in particular between 10 and 12 light sources; and/or
wherein the plurality of light sources are arranged in a circular arrangement; and/or
wherein the plurality of light sources are a plurality of LEDs.

8. The aircraft according to claim 1, wherein the plurality of light sources comprise at least two different subsets of light sources, wherein the at least two different subsets of light sources are selectively operable for providing at least two different lighting functionalities.

9. The aircraft according to claim 1, wherein the plurality of light sources are configured for emitting light having the same color or wherein the plurality of light sources are configured for emitting light having different colors.

10. The aircraft according to claim 1, further comprising an optical system, arranged over the light exit portion of the light guide at the light head for shaping a light output of the aircraft light, wherein the optical system in particular comprises at least one lens and/or at least one reflector and/or at least one shutter.

11. The aircraft according to claim 1, further comprising a controller, coupled to the light sensor, wherein the controller is configured to determine a performance level of the plurality of light sources from sensor data received from the light sensor, wherein the controller is in particular configured to detect and to communicate a near end of life condition of one or more of the plurality of light sources.

12. The aircraft according to claim 1;
wherein the aircraft light is an exterior aircraft light, wherein each of the plurality of light sources is at least one of a tail navigation light, a white tail strobe anti-collision light, an auxiliary power unit inspection light arranged in an auxiliary power unit bay, or a multi-functional exterior aircraft light, having the functionalities of at least two of the tail navigation light, the white tail strobe anti-collision light, or the auxiliary power unit inspection light.

13. The aircraft according to claim 1, wherein the aircraft is at least one of an airplane or a helicopter.

14. A method of manufacturing an aircraft light, the method comprising:
arranging a plurality of light sources on a light source support configured to be located in a vicinity of an exhaust at a tail of an aircraft;
arranging a light sensor for detecting stray light among the plurality of light sources;
arranging a light guide, comprising an optical fiber, vis-a-vis the plurality of light sources for receiving and transmitting light emitted by the plurality of light sources;
providing a coupling portion at an input end of the optical fiber facing the plurality of light sources, the coupling portion comprising a plurality of legs, with each of the plurality of legs extending between the input end of the optical fiber and a respective one of the plurality of light sources; and
arranging a light exit portion of the light guide at a light head of the aircraft light for providing light, received and transmitted from the plurality of light sources, for a light output of the aircraft light.

15. The method of claim 14, further comprising:
covering the plurality of light sources, the light sensor, and the coupling portion with an at least partially reflective cover.

\* \* \* \* \*